United States Patent
Kwon et al.

(10) Patent No.: US 11,641,660 B2
(45) Date of Patent: May 2, 2023

(54) MULTI-ANTENNA PROCESSING IN MULTI-LINK WIRELESS COMMUNICATION SYSTEMS

(71) Applicant: NXP USA, Inc., Austin, TX (US)

(72) Inventors: Young Hoon Kwon, Laguna Niguel, CA (US); Rui Cao, Sunnyvale, CA (US); Liwen Chu, San Ramon, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 107 days.

(21) Appl. No.: 17/093,255

(22) Filed: Nov. 9, 2020

(65) Prior Publication Data

US 2021/0144698 A1    May 13, 2021

Related U.S. Application Data (60) Provisional application No. 63/035,286, filed on Jun. 5, 2020, provisional application No. 62/980,205, filed
(Continued)

(51) Int. Cl.
| | |
|---|---|
| *H04W 72/04* | (2009.01) |
| *H04W 28/02* | (2009.01) |
| *H04W 52/02* | (2009.01) |
| *H04W 76/15* | (2018.01) |
| *H04W 76/14* | (2018.01) |

(Continued)

(52) U.S. Cl.
CPC ..... *H04W 72/048* (2013.01); *H04W 28/0215* (2013.01); *H04W 52/0229* (2013.01); *H04W 72/044* (2013.01); *H04W 76/14* (2018.02); *H04W 76/15* (2018.02); *H04W 84/12* (2013.01)

(58) Field of Classification Search
CPC .......... H04W 72/048; H04W 28/0215; H04W 52/0229; H04W 84/12; H04W 76/15; H04W 76/14; H04W 72/044
See application file for complete search history.

(56) References Cited

U.S. PATENT DOCUMENTS

| | | | |
|---|---|---|---|
| 8,243,710 B1 * | 8/2012 | Benveniste | H04W 74/0816 370/395.42 |
| 10,764,949 B2 * | 9/2020 | Huang | H04L 63/0209 |

(Continued)

FOREIGN PATENT DOCUMENTS

WO    WO-2021088666 A1 *    5/2021

OTHER PUBLICATIONS

Wi-Fi Alliance, "Multi-AP Specification," Version 1.0, Jun. 18, 2018; 66 pages.

*Primary Examiner* — Parth Patel (57) ABSTRACT

A method for multi-antenna processing in multi-link wireless communication systems includes transmitting by a first MLD, a first capability defining a first number of Spatial Streams (SS) supported by the first MLD for a single link exchange over one of a subset of links from a plurality of links between the first MLD and a second MLD. A second capability is transmitted by the first MLD defining a second number of SS supported by the first MLD for each link of a multi-link exchange. At least one Radio Frequency (RF) chain of the first MLD is configured to enable communication over the subset of links from the plurality of links.

20 Claims, 7 Drawing Sheets

Related U.S. Application Data on Feb. 22, 2020, provisional application No. 62/957,175, filed on Jan. 4, 2020, provisional application No. 62/934,428, filed on Nov. 12, 2019.

(51) Int. Cl.
*H04W 72/044* (2023.01)
*H04W 84/12* (2009.01)

(56) References Cited

U.S. PATENT DOCUMENTS

| | | | | |
|---|---|---|---|---|
| 11,102,689 | B2* | 8/2021 | Gupta | H04W 52/0222 |
| 11,146,956 | B2* | 10/2021 | Tomici | H04W 76/11 |
| 11,202,286 | B2* | 12/2021 | Huang | H04L 41/0893 |
| 2012/0201196 | A1* | 8/2012 | Merlin | H04W 28/065 370/328 |
| 2015/0296370 | A1* | 10/2015 | Kim | H04W 24/08 370/338 |
| 2015/0341966 | A1* | 11/2015 | Seok | H04W 76/10 370/315 |
| 2017/0171902 | A1* | 6/2017 | Tillman | H04W 76/15 |
| 2017/0257885 | A1* | 9/2017 | Zhang | H04L 5/0055 |
| 2017/0373813 | A1* | 12/2017 | Asterjadhi | H04W 24/02 |
| 2018/0007633 | A1* | 1/2018 | Mori | H04M 1/00 |
| 2018/0205502 | A1* | 7/2018 | Merlin | H04W 48/16 |
| 2018/0206284 | A1* | 7/2018 | Zhou | H04L 1/1628 |
| 2018/0262951 | A1* | 9/2018 | Jiang | H04W 28/065 |
| 2018/0302847 | A1* | 10/2018 | Chu | H04B 7/0628 |
| 2019/0082373 | A1* | 3/2019 | Patil | H04W 40/244 |
| 2019/0124596 | A1* | 4/2019 | Cao | H04W 52/0235 |
| 2019/0150063 | A1* | 5/2019 | Chu | H04W 48/16 370/338 |
| 2019/0150214 | A1* | 5/2019 | Zhou | H04L 1/1621 370/329 |
| 2019/0268892 | A1* | 8/2019 | Gidvani | H04W 72/0406 |
| 2019/0268956 | A1* | 8/2019 | Xiao | H04W 72/0453 |
| 2019/0280919 | A1* | 9/2019 | Sadeghi | H04W 72/04 |
| 2019/0335454 | A1* | 10/2019 | Huang | H04L 41/0893 |
| 2019/0364555 | A1* | 11/2019 | Huang | H04W 72/048 |
| 2019/0394688 | A1* | 12/2019 | Zhu | H04M 7/0066 |
| 2020/0008055 | A1* | 1/2020 | Jost | H04L 63/08 |
| 2020/0014599 | A1* | 1/2020 | Asterjadhi | H04W 52/0235 |
| 2020/0162964 | A1* | 5/2020 | Srinivasa | H04W 28/065 |
| 2020/0196278 | A1* | 6/2020 | Asterjadhi | H04L 61/2069 |
| 2020/0204241 | A1* | 6/2020 | Park | H04W 72/0446 |
| 2020/0221545 | A1* | 7/2020 | Stacey | H04W 48/16 |
| 2020/0280975 | A1* | 9/2020 | Asterjadhi | H04W 72/0406 |
| 2020/0344832 | A1* | 10/2020 | Hu | H04W 72/0453 |
| 2020/0374804 | A1* | 11/2020 | Mukkavilli | H04W 80/02 |
| 2021/0014911 | A1* | 1/2021 | Patil | H04W 48/08 |
| 2021/0029766 | A1* | 1/2021 | Zhang | H04W 76/15 |
| 2021/0051653 | A1* | 2/2021 | Park | H04W 72/0413 |
| 2021/0067218 | A1* | 3/2021 | Park | H04B 7/0695 |
| 2021/0076398 | A1* | 3/2021 | Naribole | H04W 72/1257 |
| 2021/0076412 | A1* | 3/2021 | Naribole | H04W 76/38 |
| 2021/0076413 | A1* | 3/2021 | Lu | H04W 74/08 |
| 2021/0076437 | A1* | 3/2021 | Kneckt | H04W 12/03 |
| 2021/0084711 | A1* | 3/2021 | Park | H04W 74/0816 |
| 2021/0100050 | A1* | 4/2021 | Ho | H04L 61/2596 |
| 2021/0100051 | A1* | 4/2021 | Ho | H04W 84/12 |
| 2021/0112541 | A1* | 4/2021 | Manolakos | G01S 5/0236 |
| 2021/0144698 | A1* | 5/2021 | Kwon | H04W 28/0215 |
| 2021/0144787 | A1* | 5/2021 | Kwon | H04W 72/121 |
| 2021/0227547 | A1* | 7/2021 | Chitrakar | H04L 5/0091 |
| 2021/0243756 | A1* | 8/2021 | Kim | H04W 72/02 |
| 2021/0360522 | A1* | 11/2021 | Chitrakar | H04L 5/0098 |
| 2021/0377923 | A1* | 12/2021 | Ge | H04W 72/0453 |
| 2021/0385006 | A1* | 12/2021 | Ryu | H04W 72/04 |
| 2021/0385692 | A1* | 12/2021 | Kwon | H04W 28/24 |
| 2021/0399850 | A1* | 12/2021 | Zhang | H04L 5/0007 |
| 2022/0022197 | A1* | 1/2022 | Zhang | H04W 24/02 |
| 2022/0070933 | A1* | 3/2022 | Zhu | H04W 74/0816 |
| 2022/0287121 | A1* | 9/2022 | Hwang | H04W 74/085 |

* cited by examiner

MULTI-ANTENNA PROCESSING IN MULTI-LINK WIRELESS COMMUNICATION SYSTEMS

CROSS-REFERENCE TO RELATED APPLICATIONS

This application is a utility application claiming priority to U.S. Provisional Application Ser. No. 62/934,428 filed on Nov. 12, 2019, entitled "APPARATUS AND METHODS FOR MULTI-ANTENNA PROCESSING IN MULTI-LINK WIRELESS COMMUNICATION SYSTEMS," U.S. Provisional Application Ser. No. 62/957,175 filed on Jan. 4, 2020, entitled "APPARATUS AND METHODS FOR POWER ADJUSTMENT IN MULTI-LINK COMMUNICATION SYSTEMS," U.S. Provisional Application Ser. No. 62/980,205 filed on Feb. 22, 2020, entitled "APPARATUS AND METHODS FOR POWER SAVE IN MULTI-LINK COMMUNICATION SYSTEMS," and U.S. Provisional Application Ser. No. 63/035,286 filed on Jun. 5 2020, entitled "APPARATUS AND METHODS FOR MULTI-ANTENNA PROCESSING IN MULTI-LINK WIRELESS COMMUNICATION SYSTEMS," the entireties of which are incorporated by reference herein.

FIELD

This disclosure relates generally to wireless communication, and more specifically to the processing of multiple antennas in a multi-link wireless communication system.

BACKGROUND

A communication system is comprised of interconnected Multi-Link Devices (MLDs). In one example, the MLDs are interconnected with an IEEE 802.11 wireless protocol. WiFi Spatial Streaming is a method used in Multiple-Input Multiple-Output (MIMO) wireless communication to transmit independent and separately coded data signals (e.g., "spatial streams (SS)") from each of the multiple transmit antennas, thus increasing system bandwidth.

Numerous interactions and complexities are introduced when optimizing systems with multiple links, SS and numerous Radio Frequency (RF) chains (e.g., an RF radio with support architecture). Depending upon various factors including for example a transmission channel characteristic, reconfiguration of a communication systems usage of links, SS and RF chains is advantageous to optimize communication bandwidth.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for efficient multi-antenna processing in multi-link wireless communication systems. In example embodiments, wireless communication between two MLDs occurs over one or more links (or communication channels), each of which are supported by one or more SS. The assignment of links and SS depend upon various factors, including but not limited to Wireless Medium Condition (WMC), the use of Master/Slave communication, dedication of links to specific Traffic Identifiers (TID), band switching and channel aggregation. Management of links and SS occurs with one or more of a static, semi-static and dynamic operation disclosed herein.

In one embodiment, when a non-AP MLD associates with an AP MLD that is operating on more than one links and if the non-AP MLD has one or more number of RF chains for each link, where each of the non-AP MLD's one or more RF chains can support the more than one links that the AP MLD is operating on, the non-AP MLD reports its supported SS (for downlink reception, uplink transmission, or both) per each link, and the non-AP MLD further reports its supported SS (for downlink reception, uplink transmission, or both) when a data frame exchange happens in one link among the more than one links.

Figure 1:
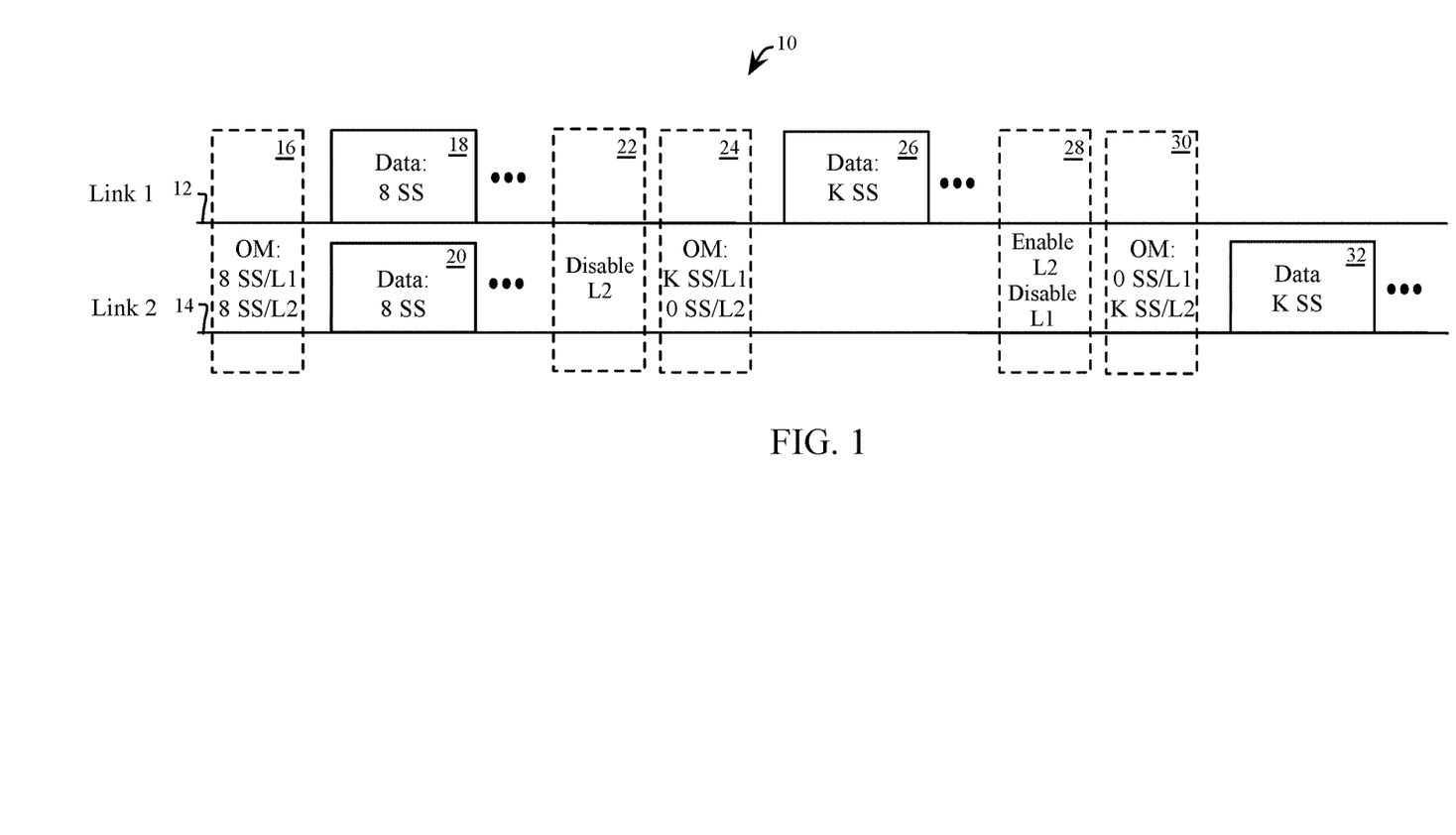
FIG. 1 is a graphical view of a sequence of transmission between two MLDs using a static operation for assigning Spatial Streams to communication links, in accordance with an example embodiment of the present disclosure.

FIG. 1 shows a sequence of transmission between two MLDs using a static operation in accordance with an example embodiment 10 of the present disclosure. The embodiment 10 includes a first link 12 and a second link 14. In one embodiment, one or more of the links 12 and 14 support one or more of a 2.4 GHz band, a 5 GHz band and a 6 GHz band, wherein RF chain hardware is shared between supported bands or between different links in one band. In the example embodiment 10, 16 RF chains are supported each associated with an antenna of an SS. In a dual link mode, the 16 RF chains are equally divided between the two links 12 and 14. It should be understood that in other embodiments a different number of SS are supported as well as an unequal division of SS between the various links. For example, in one embodiment a dual link operation (e.g., with each link supporting either 5 GHz or 6 GHz), one link will support 12 SS and the other link will support 4 SS. Support for an SS means either support for transmission, reception or both transmission and reception. It should be understood that in other embodiments a different number of SS are supported between the transmission and reception. For example, in one embodiment a dual link operation, one link will support 8 SS for the transmission and 8 SS for the reception, and the other link will support 4 SS for the transmission and 4 SS for the reception.

In the example embodiment 10, a static operation proceeds as follows. When a first MLD, for example a non-Access Point (AP) MLD associates with a second MLD (e.g., an AP MLD), the first MLD transmits an Operating Mode (OM) 16 to the second MLD. In the example embodiment 10, the OM includes a multi-link capability of 8 SS for the first link 12 and 8 SS for the second link 14. In one embodiment, the first MLD includes an "N" number of RF chains and supports more than N SS streams per configured link (e.g., by sharing RF chain hardware with more than one SS). Subsequent to configuring the links 12 and 14 for multi-link operation with RF chains for corresponding supported SS for each link, and reporting the OM 16, data frames 18 and 20 are communicated over the respective links 12 and 14. The term "communicated" in this context means to transmit, receive or transceive between the first MLD and the second MLD. In one example the first link 12 uses the 5 GHz band, while the second link 14 uses the 6 GHz band.

Subsequent to the multi-link operation reported by OM 16, the first MLD disables the second link 14, shown as step 22. After disabling the second link 14, the first MLD transmits an OM 24 to report a single-link capability of "K" (e.g., 16) SS for the first link 12 and 0 SS for the second link 14. Subsequently, the RF chains are reconfigured and a data frame 26 is communicated over the first link 12 with up to "K" SS. Subsequent to the single-link operation reported by OM 24, the first MLD enables the second link 14 and disables the first link 12, shown as step 28. After disabling the first link 12, the first MLD transmits an OM 30 to report a single-link capability of 0 SS for the first link 12 and "K" SS for the second link 14. Subsequently, the RF chains are reconfigured and a data frame 32 is communicated over the second link 14 with up to "K" SS.

Figure 2:
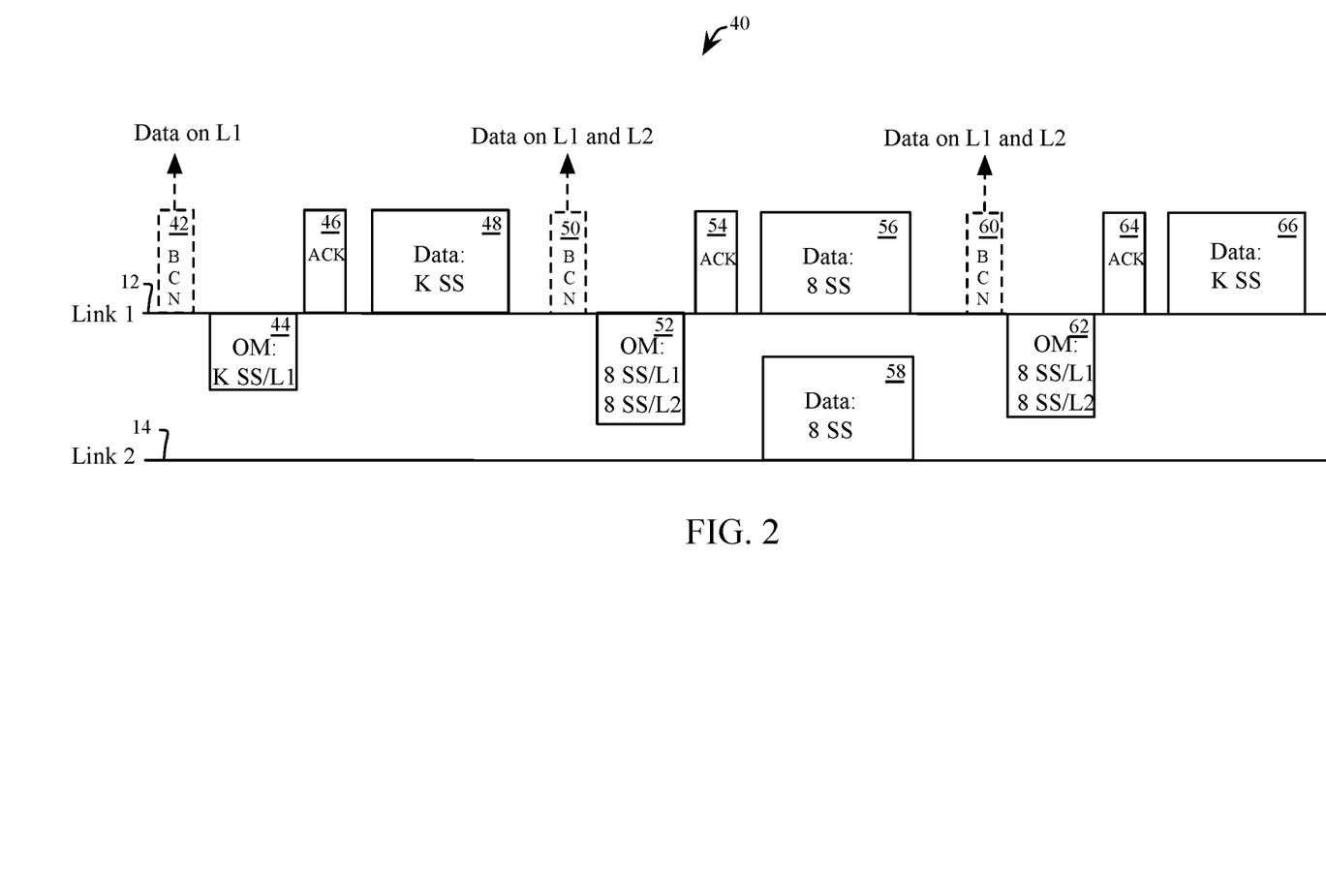
FIG. 2 is a graphical view of a sequence of transmission between two Multi-Link Devices (MLDs) using a semi-static operation for assigning Spatial Streams to communication links, in accordance with an example embodiment of the present disclosure.

FIG. 2 shows a sequence of transmission between two MLDs using a semi-static operation in accordance with an example embodiment 40 of the present disclosure. The embodiment 40 includes a first link 12 and a second link 14, each providing a communication channel between a first MLD and a second MLD. The embodiment 40 sends a beacon 42 at the second MLDs Target Beacon Transmission Time (TBTT). The beacon 42 indicates that the first link 12 is to be used for data exchange. Depending upon the links indicated in the beacon frame 42, the first MLD transmits an OM 44 with the supported SS for each link. For example, the OM 44 indicates support for "K" SS on the first link 12. The second MLD transmits an acknowledgement (ACK) 46 in response to the OM 44. The first MLD then configures RF chains for the supported SS and transmits data frames 48 over the first link 12 with up to "K" SS.

A beacon frame 50 in a subsequent TBTT is transmitted by the second MLD and indicates a multi-link operation over both the first link 12 and the second link 14. Accordingly, the first MLD transmits an OM 52 indicating support for 8 SS on the first link 12 and 8 SS on the second link L2. In other embodiments, the SS is shared unequally between the links 12 and 14. The second MLD transmits an acknowledgement (ACK) 54 in response to the OM 52. The first MLD then configures RF chains for the supported SS and transmits data frames 56 and 58 over the first link 12 and second link 14 respectively.

A beacon frame 60 in a subsequent TBTT is transmitted by the second MLD and indicates a multi-link operation over both the first link 12 and the second link 14. Accordingly, the first MLD transmits an OM 62 indicating support for 8 SS on the first link 12 and 8 SS on the second link L2. In other embodiments, the SS is shared unequally between the links 12 and 14. The second MLD transmits an acknowledgement (ACK) 64 in response to the OM 62.

The first MLD further performs a Clear Channel Assessment (CCA) to determine a WMC on each of the first link 12 and the second link 14. For example, if the second link 14 is determined to have a WMC because of conflicting traffic (a "busy" condition), the first MLD detects and removes the second link 14 from the usable links (or "reported subset of links"). Accordingly, the first MLD then configures RF chains for the supported SS to support a single-link operation using "K" SS and transmits data frames 66 only over the first link 12.

In another embodiment, where the first MLD operates in a multi-link operation as indicated by OM 52, the first MLD will first content the wireless medium defined as a master link, for example the first link 12. The first MLD will then use additional links (e.g., the second link 14) as slave links depending upon the channel condition or traffic contention on the slave links. In another embodiment, where the first MLD operates in a multi-link operation as indicated by OM 52, specific links are designed for specific traffic categories, such as TID. In one example, the first link 12 is only used for transmission of a first TID, the second link 14 is only used for transmission of a second TID, and either link 12 or 14 are used for a third TID.

Figure 3:
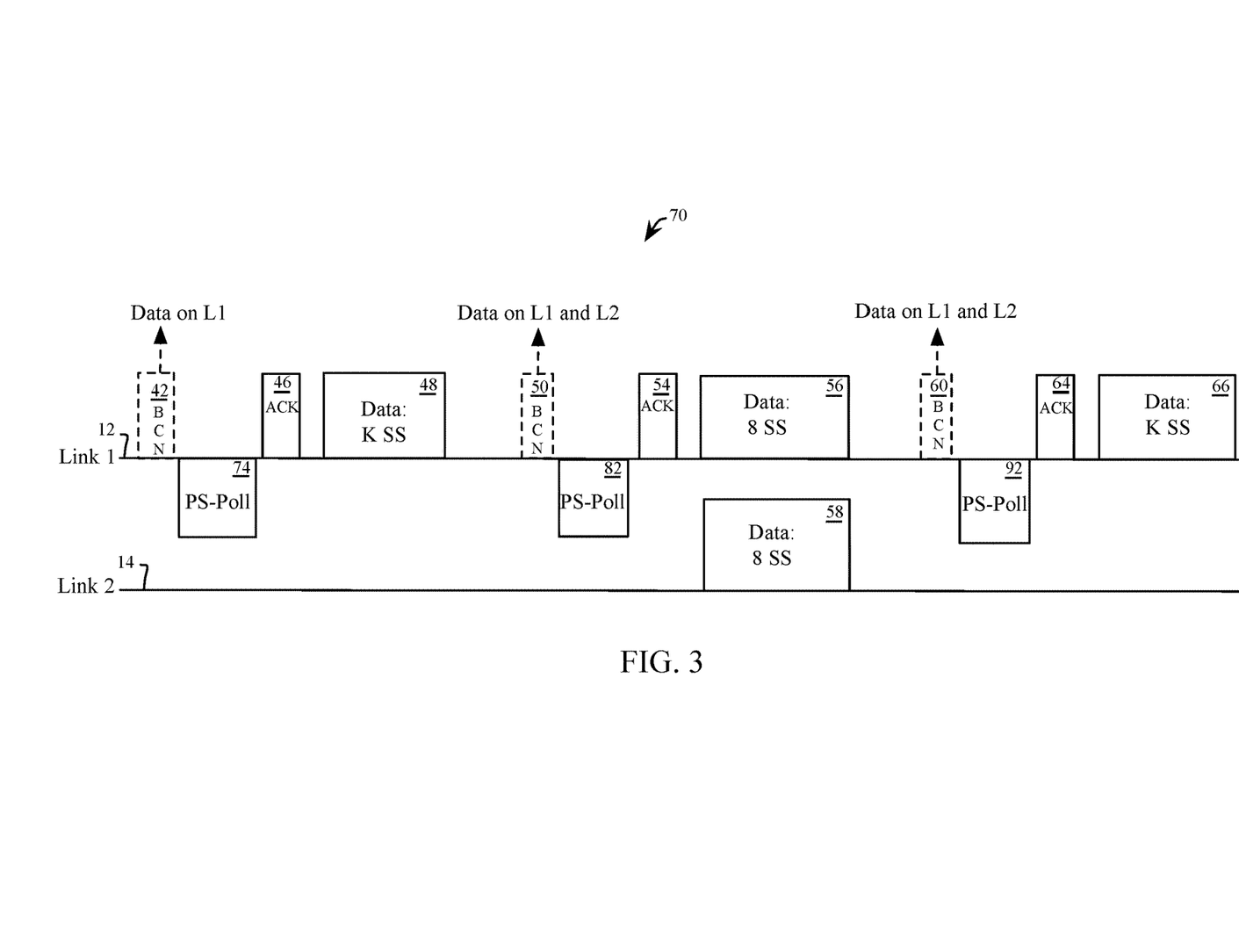
FIG. 3 is a graphical view of a sequence of transmission between two Multi-Link Devices (MLDs) using a semi-static operation for assigning Spatial Streams to communication links, in accordance with an example embodiment of the present disclosure.

FIG. 3 shows a sequence of transmission between two MLDs using a semi-static operation in accordance with an example embodiment 70 of the present disclosure. The embodiment 70 of FIG. 3 differs from the embodiment 40 in FIG. 2, in that the OM 44, 52 and 62 is substituted with either a Power Save (PS)-Poll frame 74, 82 and 92 respectively or a respective Quality of Service (QoS) Null frame. When an OM is used, as shown in FIG. 2, the OM indicates the number of SS to be used for each link. This implies that the second MLD (e.g., an AP MLD) will determine how many SS to be used on each link based on the OM indication. When a PS-Poll frame or a QoS Null frame is used, as shown in FIG. 3, the second MLD knows how many SS to use on each link, and the QoS Null frame or PS-Poll frame simply indicates which link is to be used for data frame transmission.

Various embodiments of a static operation will now be described in further detail. A non-AP MLD indicates its capabilities including a first capability of the maximum number of SS that the non-AP MLD is capable of transmitting or receiving at a time while operating in any of links within a reported subset of links, a second capability of the maximum number of SS that the non-AP MLD is capable of transmitting or receiving on each link when the non-AP MLD exchanges data frame on multiple links. The non-AP MLD receives an indication from an AP-MLD that a data exchange is expected on a first link, wherein the first link is within the reported subset of links. Then, the non-AP MLD adjusts its RF paths in a way that the non-AP MLD can receive (or transmit) the number of SS up to the first capability on the first link. Then, the non-AP MLD exchanges data frames with the AP-MLD with using the number of SS up to the first capability on the first link. In one embodiment, the first capability is greater than the second capability. In other example embodiment, the indication from the AP-MLD is indicated on a Beacon frame.

Figure 4:
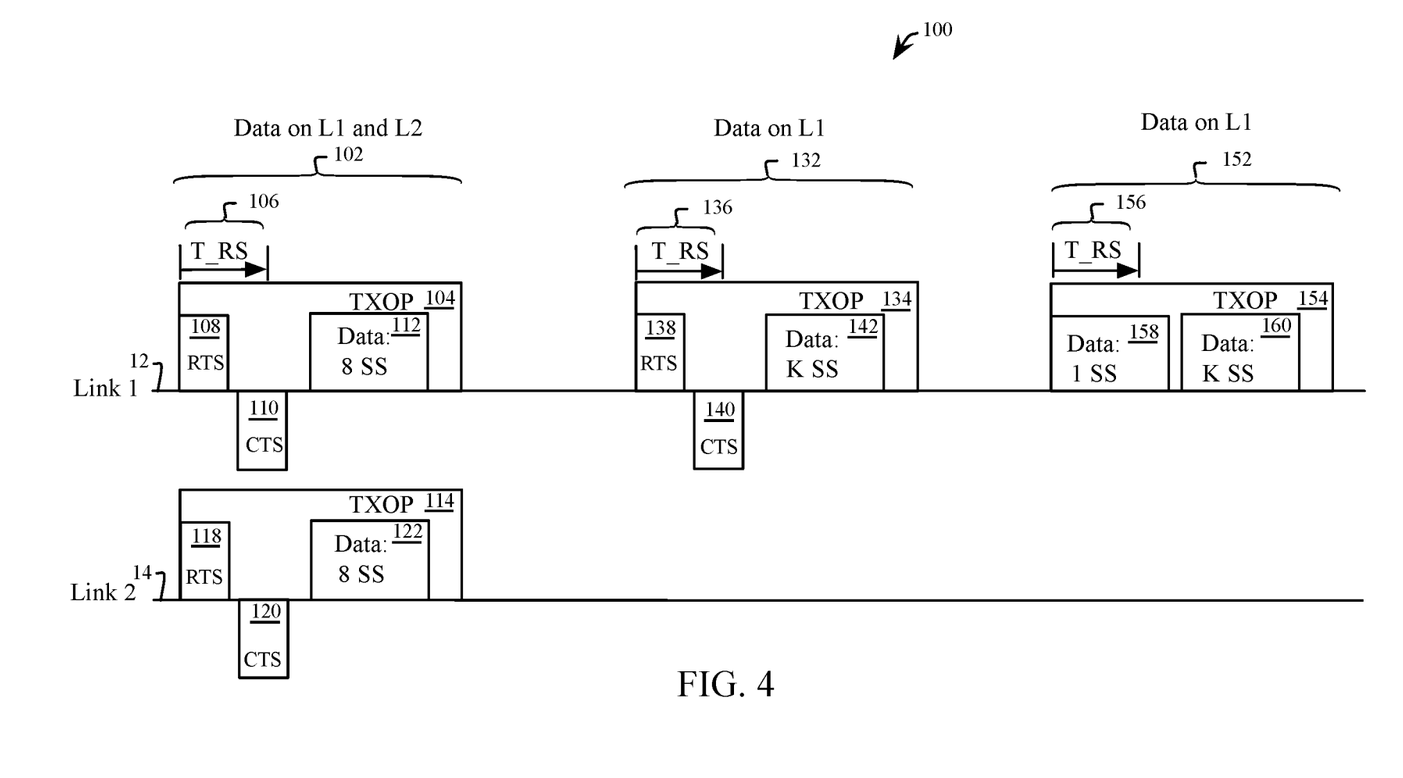
FIG. 4 is a graphical view of a sequence of transmission between two Multi-Link Devices (MLDs) using a dynamic operation for assigning Spatial Streams to communication links, in accordance with an example embodiment of the present disclosure.

FIG. 4 shows a sequence of transmission between two MLDs using a dynamic operation in accordance with an example embodiment 100 of the present disclosure. The embodiment 100 includes a first operation 102, wherein data frames are transmitted on both the first link 12 and the second link 14. During a Transmit Opportunity (TXOP) 104, transmission on the links 12 and 14 is permitted. During an initial period equal to a maximum RF chain switching time 106, the second MLD initiates data frame transfers using an initial set of links, chosen from the reported subset of links, to transmit packets identifying subsequent links to be used for data frame transfers. For this purpose, the second MLD initiates a Request To Send (RTS) 108 to the first MLD. The first MLD responds with a Clear To Send (CTS) 110. The first MLD then reconfigures RF chains to support the SS streams over the subsequent links used for receiving data frames 112. The period T_RS 106 is required to provide the first MLD sufficient time to reconfigure RF chains for the subsequent transfer of data frames 112. During the first operation 102, the second link 14 is configured similar to the first link 12 during a TXOP 114, with an initial RTS 118 transmitted by the second MLD, a CTS 120 transmitted by the first MLD and a transfer of data frames 122. In one embodiment, the first MLD further defines a maximum number of SS that can be received on each link during the T_RS 106 period prior to switching RF chains, and a maximum number of SS that can be received on each link after the T_RS 106 period, after switching RF chains.

In the embodiment 100, a second operation 132 is performed only over the first link 12. The second MLD initiates a TXOP 134 by transmitting a packet to the first MLD during the period T_RS 136 using a number of SS (e.g., 8 SS), limited by the second capability, wherein the second capability defines a maximum number of SS supported by the first MLD for each link of a multi-link exchange. For this purpose, the second MLD initiates a RTS 138 to the first MLD. In response to the first MLD receiving the RTS 138, the first MLD transmits a CTS 140. The first MLD reconfigures RF chains during the period T_RS 136 to support the links used by the second MLD for the subsequent transfer of data frames 142 during the TXOP 134. In this case, only the first link 12 was used to initiate the TXOP 134, hence the first MLD configures up to "K" SS on the first link 12 and then receives data frames 142.

In the embodiment 100, a third operation 152 is performed only over the first link 12. The second MLD initiates a TXOP 152 by transmitting a data frame 158 to the first MLD during the period T_RS 156 using 1 SS, limited by the second capability, wherein the second capability defines a maximum number of SS supported by the first MLD for each link of a multi-link exchange. The first MLD reconfigures RF chains during the period T_RS 156 to support the links used by the second MLD for the subsequent transfer of data frames 160 during the TXOP 154. In this case, only the first link 12 was used to initiate the TXOP 154, hence the first MLD configures up to "K" SS on the first link 12 and then receives data frames 160.

Various embodiments of a dynamic operation will now be described in further detail. When a non-AP MLD associates with an AP MLD, the non-AP MLD declares its capabilities including a first capability of the maximum number of SS that the non-AP MLD is capable of transmitting or receiving at a time, while operating in any of links within a reported subset of links, a second capability of the maximum number of SS that the non-AP MLD is capable of transmitting or receiving on each link when the non-AP MLD exchanges data frame on multiple links, a third capability of the maximum required time for RF chain switching (T_RS). In one embodiment, when an AP MLD initiates a TXOP for the non-AP MLD by transmitting an initial frame that initiates the TXOP, the number of SS for the initial frame satisfies the second capability, and the AP MLD transmits a follow-up data frames to the non-AP MLD within the TXOP that satisfies the first capability after T_RS has passed. Therefore, when the non-AP MLD receives the initial frame, the non-AP MLD identifies a link that the initial frame is received and adjusts its RF chains to the link.

Figure 5:
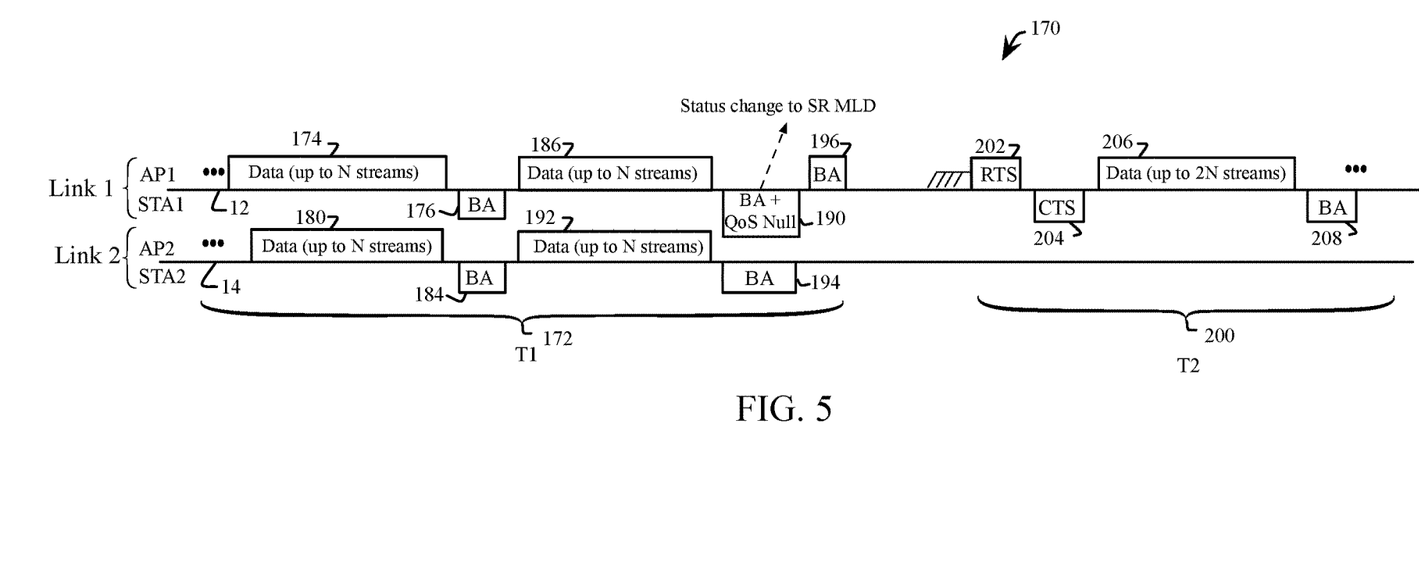
FIG. 5 is a graphical view of a sequence of transmission between two MLDs using the static operation for an Opportunistic Single Radio (OSR), in accordance with an example embodiment of the present disclosure.

FIG. 5 shows a sequence of transmission between two MLDs using the static operation for an OSR, in accordance with an example embodiment 170 of the present disclosure. The OSR enables an MLD to share its RF chains dynamically among a plurality of links by declaring itself to be in either a Multi-Radio (MR) operation or a Single-Radio (SR) operation. In one embodiment, the MR operation and the SR operation have different capabilities. In FIG. 5, a non-AP MLD station and an AP MLD operate over a first link 12 and a second link 14. Specifically, the non-AP MLD station is shown as "STAT" operating on the first link 12 and "STA2" operating on the second link 14. Similarly, the AP MLD is shown as "AP1" operating on the first link 12 and "AP2" operating on the second link 14.

When configured as an MR operation, the non-AP MLD supports the reception of "N" SS on both the first link 12 and the second link 14 for downlinks (DL). When configured as an SR operation, the non-AP MLD supports the reception of "2N" SS on either the first link 12 and the second link 14 for DL. It should be understood, that throughout this disclosure, the number of SS supported for each link is shown to be same (e.g., N), however the number of SS can be different between links, without loss of generality. Furthermore, while two links are shown for multi-link operations for clarity, the number of links are more than two in other embodiments, without loss of generality. It should be understood also, that the number of SS supported is for DL reception, however the number of SS supported for an uplink (UL) transmission can be configured similarly, without loss of generality.

During a first time period (T1) 172, the non-AP MLD is configured as an MR operation. Data frames 174 using up to N SS, are transmitted by AP1 over the first link 12, followed by a Block Acknowledgement (BA) 176 by STA1 to acknowledge receipt of the data frames 174. Concurrently, data frames 180 using up to N SS, are transmitted by AP2 over the second link 14, followed by a BA 184 by STA2 to acknowledge receipt of the data frames 180. Subsequently, data frames 186 using up to N SS, are transmitted by AP1 over the first link 12, followed by a response frame 190 by STA1, wherein the response frame 190 includes a BA to acknowledge receipt of the data frames 186. Concurrently, data frames 192 using up to N SS, are transmitted by AP2 over the second link 14, followed by a BA 194 by STA2 to acknowledge receipt of the data frames 192. The transmission of the response frame 190 by STA1 further includes a QoS Null frame (or in another embodiment, a PS-Poll as shown in FIG. 3) to instruct the AP MLD that the non-AP MLD will change from an MR operation to a SR operation (A-Control subfield of the QoS Null frame can be used for the instruction). Accordingly, the AP MLD acknowledges the QoS Null frame with a BA 196.

During a second time period (T2) 200 from the start of the next TXOP, the non-AP MLD is configured as an SR operation. During T2 200, the AP MLD uses up to 2N SS for DL transmission over a single link (e.g., the first link 12) after initial frame exchange. In one embodiment, the AP MLD choses either the first link 12 or the second link 14, depending upon factors such as traffic condition to send the RTS 202 to initiate a TXOP. Specifically, the AP MLD monitors both the first link 12 and the second link 14, but only transmits or receives frames on one link at a time. In another embodiment, the non-AP MLD operates in a dynamic Spatial Multiplexing (SM)-Power Save Mode, wherein all but a single radio is powered down and the AP MLD only uses up to 1 SS for RTS transmission. Following the RTS 202 by AP1, the STA1 sends a CTS 204. Data frames 206 are transmitted by AP1 with up to 2N SS, followed by a BA 208 by STA1.

With on-going reference to FIG. 5, in another embodiment the non-AP MLD has different capabilities for an MR operation and for an SR operation. The different capabilities of the non-AP MLD include, but are not limited to, supporting a different number of SS for transmit, receive, or both transmit and receive, having a different number of space-time streams supported for transmit, receive or both transmit and receive, having a different supported bandwidth, a different supported data rate, a different modulation and coding scheme (MSC), and the like. In one embodiment, when the non-AP MLD is in an MR operation, the non-AP MLD is a Non-Simultaneous Transmit and Receive (NSTR) MLD. In one embodiment, when the non-AP MLD is in an SR operation, the non-AP MLD operates under an SM power save mode.

Throughout the disclosure, a MR operation implies that a MLD operates with more than one radio such that the MLD can transmit frames on more than one link at a time and receive frames on more than one link at a time, and an MLD in MR operation is denoted as a MR MLD for the simplicity of description. Throughout the disclosure, a SR operation implies that an MLD can transmit a frame on one link only at a time, and a MLD in SR operation is denoted as a SR MLD for the simplicity of description. Furthermore, in example embodiments, an MLD in an SR operation receives data/management frames on one link only at a time. In one embodiment, a SR operation is defined among a set of links out of the MLD's associated links. For example, if a non-AP MLD has 3 links (e.g., L1/L2/L3), and the non-AP MLD operates independently on L1 but operates as a SR MLD on L2 and L3, for the simplicity of description, the non-AP MLD is denoted as a SR MLD when discussion is focused on L2 and L3, even though the non-AP MLD can operate as a MR MLD between L1 and L2/L3. Throughout the disclosure, an SR operation implies an SR operation and/or an enhanced SR operation interchangeably unless otherwise specified, where a non-AP MLD in the enhanced SR operation can further listen on one or more links simultaneously. A listening operation includes CCA as well as receiving initial messages (e.g. RTS). Transmission and/or reception link of a SR MLD can be different at different time. For example, when a SR MLD operates on L1 and L2, the SR MLD can transmit/receive frames on L1 at one time duration and on L2 at different time duration (without any link switching indication). In other embodiments, other terminologies are used for "SR MLD" such as "single link MLD", "TDM MLD" and the like, without loss of generality. Throughout the disclosure, in various embodiments when a non-AP MLD declares itself as a MR MLD and as a SR MLD, the declaration is achieved in multiple ways including without limit: (1) The non-AP MLD declares itself as a MR MLD and also declares itself as a SR MLD; (2) The non-AP MLD declares itself as a MR MLD and also indicates that it can operate as a SR MLD; (3) The non-AP MLD declares itself as a SR MLD and also indicates that it can operate as a MR MLD; and (4) The non-AP MLD declares itself as another type of MLD that can support both operation of MR MLD and operation of SR MLD.

Various embodiments of an OSR MLD with a static operation will now be described in further detail. A non-AP MLD and an AP MLD exchange signaling that the non-AP MLD operates as a MR MLD or a SR MLD. Once the non-AP MLD and the AP MLD acknowledge that the non-AP MLD's status is either a MR MLD or a SR MLD, the non-AP MLD's status is maintained until another signaling exchange is performed. In another embodiment, the non-AP MLD transmits a first frame with the request of the non-AP MLD's status change in a Media Access Control (MAC) header of the first frame. In one embodiment, one variant of A-Control subfield is used in the MAC header for this purpose. In one embodiment, when the AP MLD transmits an acknowledgement frame in response to the first frame, the signaling exchange for the non-AP MLD's status change is considered successful. In one embodiment, the one variant of A-Control subfield includes a bitmap, wherein each bit in the bitmap corresponds to a status of a set of links, and wherein if the bitmap is set such that only one link is available among a first set of links, this implies that the non-AP MLD is requesting the change of status to SR MLD among the first set of links. In one embodiment, if the bitmap is set such that more than one link is available among the first set of links, this implies that the non-AP MLD is requesting the change of status to MR MLD among the first set of links. In one embodiment, the number of links in the first set of links is 2, and the non-AP MLD is a NSTR MLD on the first set of links if the non-AP MLD operates as a MR MLD. In one embodiment, the one variant of A-Control subfield includes an indication, wherein if the indication is set to a first state it indicates that the non-AP MLD intends to operate as a SR MLD, and if the indication is set to a second state it indicates that the non-AP MLD intends to operate as a MR MLD.

In one embodiment of a static OSR MLD, the non-AP MLD transmits a first management frame including the request of the non-AP MLD's status change. In one embodiment, the first management frame is an Operating Mode Notification frame. In one embodiment, the first management frame includes an Operating Mode field which may be a modified version of the Operating Mode field to include added features for the IEEE 802.11be wireless standard. In one embodiment, when the AP MLD transmits an acknowledgement frame in response to the first management frame, the signaling exchange for the non-AP MLD's status change is considered successful. In one embodiment, the first management frame includes a bitmap, wherein each bit in the bitmap corresponds to a status of a set of links, and wherein if the bitmap is set such that only one link is available among a first set of links, this implies that the non-AP MLD is requesting the change of status to SR MLD among the first set of links. In one embodiment, if the bitmap is set such that more than one link is available among the first set of links, this implies that the non-AP MLD is requesting the change of status to MR MLD among the first set of links. In one embodiment, the number of links in the first set of links is 2, and the non-AP MLD is a NSTR MLD on the first set of links if the non-AP MLD operates as a MR MLD. In one embodiment, the first management frame includes an indication, wherein if the indication is set to a first state it indicates that the non-AP MLD intends to operate as a SR MLD, and if the indication is set to a second state it indicates that the non-AP MLD intends to operate as a MR MLD. In one embodiment, when the non-AP MLD and the AP MLD exchange signaling, the non-AP MLD's status change happens after a first-time duration. In one embodiment, when the non-AP MLD and the AP MLD exchange signaling, the non-AP MLD's status change happens after a first-time duration.

In one embodiment, the AP MLD initiates the signaling exchange for the status change of the non-AP MLD. In one embodiment, the AP MLD can transmit a first frame with the request of the non-AP MLD's status change in a MAC header of the first frame. In one embodiment, one variant of A-Control subfield is used in the MAC header for this purpose. In one embodiment, when the non-AP MLD transmits an acknowledgement frame in response to the first frame, the signaling exchange for the non-AP MLD's status change is considered successful. In one embodiment, the one variant of A-Control subfield includes a bitmap, wherein each bit in the bitmap corresponds to a status of a set of links, and wherein if the bitmap is set such that only one link is available among a first set of links, this implies that the AP MLD is requesting the non-AP MLD to change its status to SR MLD among the first set of links. In one embodiment, if the bitmap is set such that more than one link is available among the first set of links, this implies that the AP MLD is requesting the non-AP MLD to change its status to MR MLD among the first set of links. In one embodiment, the number of links in the first set of links is 2, and the non-AP MLD is a NSTR MLD on the first set of links if the non-AP MLD operates as a MR MLD. In one embodiment, the one variant of A-Control subfield includes an indication, wherein if the indication is set to a first state it indicates that the AP MLD requests the non-AP MLD to operate as a SR MLD, and if the indication is set to a second state it indicates that the AP MLD requests the non-AP MLD to operate as a MR MLD. In one embodiment, the AP MLD can transmit a first management frame including the request of the non-AP MLD's status change. In one embodiment, the first management frame is an Operating Mode Notification frame. In one embodiment, the first management frame includes an Operating Mode field which may be a modified version of the Operating Mode field to include added features for the IEEE 802.11be standard. In one embodiment, when the non-AP MLD transmits an acknowledgement frame in response to the first management frame, the signaling exchange for the non-AP MLD's status change is considered successful. In one embodiment, the first management frame includes a bitmap, wherein each bit in the bitmap corresponds to a status of a set of links, and wherein if the bitmap is set such that only one link is available among a first set of links, this implies that the AP MLD is requesting the non-AP MLD to change its status to SR MLD among the first set of links. In one embodiment, if the bitmap is set such that more than one link is available among the first set of links, this implies that the AP MLD is requesting the non-AP MLD to change its status to MR MLD among the first set of links. In one embodiment, the number of links in the first set of links is 2, and the non-AP MLD is a NSTR MLD on the first set of links if the non-AP MLD operates as a MR MLD. In one embodiment, the first management frame includes an indication, wherein if the indication is set to a first state it indicates that the AP MLD requests the non-AP MLD to operate as a SR MLD, and if the indication is set to a second state it indicates that the AP MLD requests the non-AP MLD to operate as a MR MLD.

Figure 6:
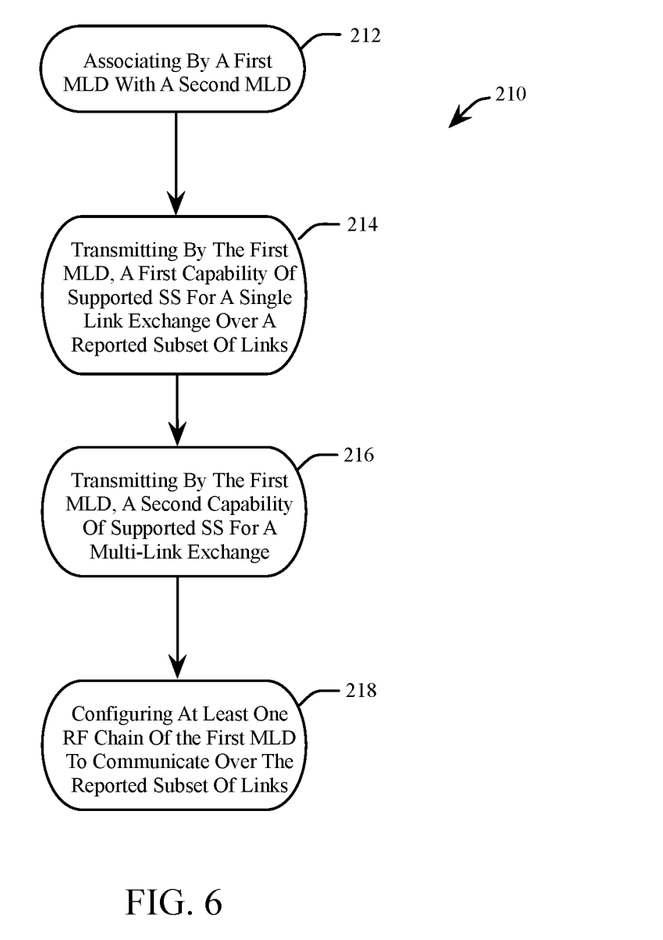
FIG. 6 is a flowchart representation of a method for multi-antenna processing in multi-link wireless communication systems, in accordance with an example embodiment of the present disclosure.

FIG. 6 shows an example embodiment 210 of a method for multi-antenna processing in multi-link wireless communication systems. At 212, a first MLD associates with a second MLD. In one embodiment, the first MLD is a non-AP MLD and the second MLD is an AP MLD. At 214, the first MLD transmits a first capability of supported SS for a single link exchange over a reported subset of links from a plurality of links. In one embodiment, the first capability indicates the maximum number of SS that the first MLD is capable of transmitting or receiving at a time, while operating in any of the links within the reported subset of links. In one example, the reported subset of links is defined by the first MLD. In another example, the reported subset of links is defined by the second MLD. In another embodiment, the first capability is applied for a data reception/transmission after initial frame exchange when the first MLD is in SR operation. At 216, the first MLD transmits a second capability of supported SS for a multi-link exchange. In one example embodiment, the first capability equals "K" SS and the second capability equals "K/2" SS. In another example embodiment, the first capability equals 16 SS and the second capability equals 8 SS. In another embodiment, the second capability indicates the maximum number of SS that the first MLD is capable of transmitting or receiving on each link when the first MLD is MR operation. In another embodiment, the second capability for different link is different. In another embodiment, the second capability is applied for a data reception/transmission when the first MLD is in MR operation. In another embodiment, the second capability is applied for frame reception/transmission for initial frame exchange when the first MLD is in SR operation. At 218, at least one RF chain of the first MLD is configured to communicate over the reported subset of links.

Figure 7:
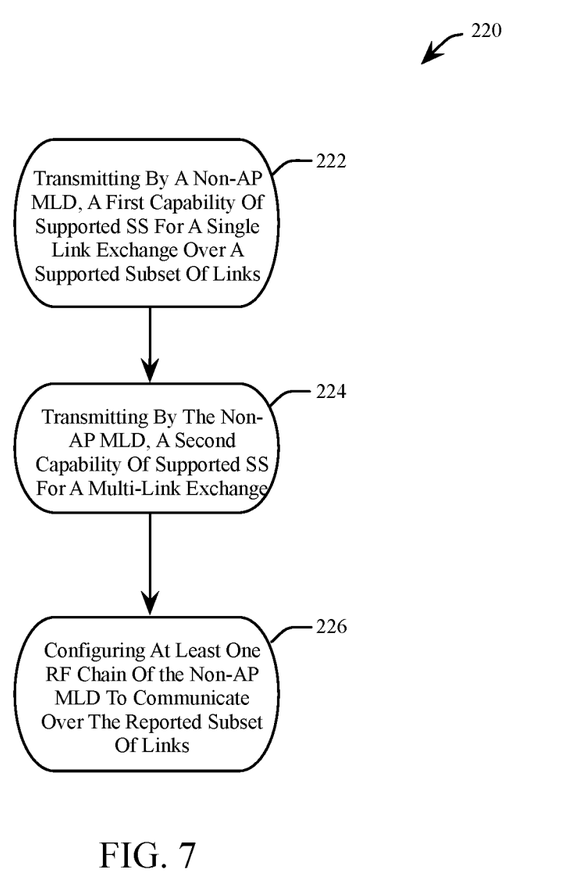
FIG. 7 is a flowchart representation of a method for multi-antenna processing in multi-link wireless communication systems, in accordance with an example embodiment of the present disclosure.

FIG. 7 shows an example embodiment 220 of a method for multi-antenna processing in multi-link wireless communication systems. At 222, the non-AP MLD transmits a first capability of supported SS for a single link exchange over a reported subset of links from a plurality of links. In one embodiment, the first capability indicates the maximum number of SS that the non-AP MLD is capable of transmitting or receiving at a time, while operating in any of the links within the reported subset of links. In one example, the reported subset of links is defined by the non-AP MLD. In another example, the reported subset of links is defined by the AP MLD. In another embodiment, the first capability is applied for a data reception/transmission after initial frame exchange when the non-AP MLD is in SR operation. At 224, the non-AP MLD transmits a second capability of supported SS for a multi-link exchange. In one example embodiment, the first capability equals "K" SS and the second capability equals "K/2" SS. In another example embodiment, the first capability equals 16 SS and the second capability equals 8 SS. In another embodiment, the second capability indicates the maximum number of SS that the non-AP MLD is capable of transmitting or receiving on each link when the non-AP MLD is MR operation. In another embodiment, the second capability for different link is different. In another embodiment, the second capability is applied for a data reception/transmission when the non-AP MLD is in MR operation. In another embodiment, the second capability is applied for frame reception/transmission for initial frame exchange when the non-AP MLD is in SR operation. At 226, at least one RF chain of the non-AP MLD is configured to communicate over the reported subset of links.

An example of sharing RF chains will now be described. A non-AP MLD may operate in the enhanced multi-link multi-radio (EMLMR) mode on a specified set of the enabled links between the non-AP MLD and its associated AP MLD. The specified set of the enabled links in which the EMLMR mode is applied is called EMLMR links.

An MLD with the variable "dot11EHTEMLMROptionImplemented" equal to true shall set the EMLMR Support subfield of a first Capabilities element, which indicates MLD level capabilities, to 1; otherwise, the MLD shall set the EMLMR Support subfield to 0. A non-AP MLD with dot11EHTEMLMROptionImplemented equal to true shall set the EMLMR Rx NSS subfield of a first element to dot11SupportedEMLMRRxNSS and the EMLMR Tx NSS subfield of TBD element to dot11SupportedEMLMRTxNSS, which indicate MLD level capabilities.

A non-AP MLD with dot11EHTEMLMROptionImplemented equal to true operates in the EMLMR mode by a separate signaling (e.g., EHT Operating Mode indication.). A non-AP MLD with dot11EHTEMLMROptionImplemented equal to true may indicate its link switch delay in a first management frame.

When a non-AP MLD operates in the EMLMR mode, after initial frame exchange subject to its per-link spatial stream capabilities and operating mode on one of the EMLMR links, the non-AP MLD shall be able to support the following until the end of the frame exchange sequence initiated by the initial frame exchange: (i) Receive PPDUs with the number of spatial streams up to the value as indicated in the EMLMR Rx NSS subfield of TBD element at a time on the link for which the initial frame exchange was made, (ii) Transmit PPDUs with the number of space-time streams up to the value as indicated in the EMLMR Tx NSS subfield of TBD element at a time on the link for which the initial frame exchange was made.

After the end of the frame exchange sequence, each STA of the non-AP MLD in the EMLMR mode shall be able to transmit or receive PPDU, subject to its per-link spatial stream capabilities and operating mode and any switching delay indicated by the non-AP MLD.

As will be appreciated, embodiments as disclosed include at least the following. In one embodiment, a method for multi-antenna processing in multi-link wireless communication systems comprises associating by a first Multi-Link Device (MLD) with a second MLD. The first MLD transmits a first capability defining a first number of Spatial Streams (SS) supported by the first MLD for a single link exchange over one of a subset of links from a plurality of links between the first MLD and the second MLD. The first MLD transmits a second capability defining a second number of SS supported by the first MLD for each link of a multi-link exchange. At least one Radio Frequency (RF) chain of the first MLD is configured to enable communication over the subset of links from the plurality of links.

Alternative embodiments of the method for multi-antenna processing in multi-link wireless communication systems include one of the following features, or any combination thereof. The first MLD transmits an indication that the first MLD operates with the single link exchange over the subset of links; the first MLD receives an initial frame from the second MLD on a first link selected from the subset of links; and at least the first number of RF chains of the first MLD is configured to enable communication over the first link. The first MLD configures the second number of RF chains for each link of the subset or links from the plurality of links before receiving the initial frame. The indication is included in a Media Access Control (MAC) header of a frame that the first MLD transmits to the second MLD. An identification of the subset of links is transmitted by the first MLD as an Operating Mode (OM) of the first MLD, wherein the OM further indicates that the first MLD operates with one of the first capability and the second capability. The first MLD operates with one of the second capability wherein a plurality of data frames comprises a first set of frames and a second set of frames, wherein the first set of frames is transmitted over a first link and the second set of frames is transmitted over a second link; and the first capability wherein the plurality of data frames is transmitted over one of the first link and the second link. An indication of the subset of links is transmitted by the first MLD as one of a Quality of Service (QoS) Null frame and a Power Save (PS)-Poll frame of the first MLD in response to the second MLD transmitting a beacon frame monitored by the first MLD, wherein the beacon frame comprises a set of second MLD links enabled by the second MLD and the one of the QoS Null frame and the PS-Poll frame defines a set of first MLD links chosen from the set of second MLD links. The first MLD transmits an information defining a maximum RF chain switching time. The subset of links comprises an initial set of links used by the second MLD to transmit a Transmit Opportunity (TX_OP) packet during a period equal to the maximum RF chain switching time.

In another embodiment, an apparatus comprises a first multi-link device (MLD) configured to transmit a first capability defining a first number of Spatial Streams (SS) supported by the first MLD for a single link exchange over one of a subset of links from a plurality of links, transmit a second capability defining a second number of SS supported by the first MLD for each link of a multi-link exchange, and configure at least one Radio Frequency (RF) chain of the first MLD to enable communication over the subset of links; and a second MLD configured to transceive with the first MLD over the subset of links.

Alternative embodiments of the apparatus include one of the following features, or any combination thereof. The first MLD is configured to transmit an indication that the first MLD operates with the single link exchange over the subset of links, receive an initial frame from the second MLD on a first link selected from the subset of links, and configure at least the first number of RF chains of the first MLD to enable communication over the first link. The first MLD is configured to configure the second number of RF chains for each link of the subset of links from the plurality of links before receiving the initial frame. The indication is included in a Media Access Control (MAC) header of a frame that the first MLD transmits to the second MLD. The first MLD is a non-Access Point (AP) MLD and the second MLD is an AP MLD. Two or more RF chains of the first MLD share a common transceiver during the multi-link exchange.

In another embodiment, a method for multi-antenna processing in multi-link wireless communication systems comprises transmitting by a non-Access Point (AP) Multi-Link Device (MLD), a first capability defining a first number of Spatial Streams (SS) supported by the non-AP MLD for a single link exchange over one of a subset of links from a plurality of links between the non-AP MLD and an AP MLD. The non-AP MLD transmits a second capability defining a second number of SS supported by the non-AP MLD for each link of a multi-link exchange. At least one Radio Frequency (RF) chain of the non-AP MLD is configured to enable communication over the subset of links from the plurality of links.

Alternative embodiments of the method for multi-antenna processing in multi-link wireless communication systems include one of the following features, or any combination thereof. The plurality of links comprises a master link and a plurality of slave links, the non-AP MLD performing a multi-link exchange with the AP MLD by transceiving over the master link followed by transceiving over one or more slave links determined to be available based on a Clear Channel Assessment. The non-AP MLD performs a multi-link exchange with the AP MLD by transceiving over one or more of the plurality of links determined by a traffic category of each of the one or more links. A Clear Channel Assessment detects and removes a busy link from the subset of links. The non-AP MLD transmits an information defining a maximum RF chain switching time, and wherein the subset of links comprises an initial set of links used by the AP MLD to transmit a Transmit Opportunity (TX_OP) packet during a period equal to the maximum RF chain switching time.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for multi-antenna processing in multi-link wireless communication systems comprising:
   associating by a first Multi-Link Device (MLD) with a second MLD;
   transmitting by the first MLD, a first capability defining a first number of Spatial Streams (SS) supported by the first MLD for a single link exchange over one of a subset of links from a plurality of links between the first MLD and the second MLD;
   transmitting by the first MLD, a second capability defining a second number of SS supported by the first MLD for each link of a multi-link exchange; and
   configuring at least one Radio Frequency (RF) chain of the first MLD to enable communication over the subset of links from the plurality of links;
   wherein the second MLD transmits beacon frames in a regular interval, the first capability is transmitted in response to the second MLD transmitting a beacon frame which indicates the single link exchange between the first MLD and the second MLD and the second capability is transmitted in response to the second MLD transmitting a beacon frame which indicates the multi-link exchange between the first MLD and the second MLD; and
   wherein the first MLD transmits data frames only over the first number of SS of a single link of the first MLD to the second MLD in response to the first capability being transmitted by the first MLD and the first MLD transmits data frames over the second number of SS of each link of a plurality of links of the first MLD to the second MLD in response to the second capability being transmitted by the first MLD.

2. The method of claim 1 further comprising:
   transmitting by the first MLD, an indication that the first MLD operates with the single link exchange over the subset of links,
   receiving by the first MLD, an initial frame from the second MLD on a first link selected from the subset of links, and
   configuring at least the first number of RF chains of the first MLD to enable communication over the first link.

3. The method of claim 2 wherein the first MLD configures the second number of RF chains for each link of the subset of links from the plurality of links before receiving the initial frame.

4. The method of claim 2 wherein the indication is included in a Media Access Control (MAC) header of a frame that the first MLD transmits to the second MLD.

5. The method of claim 1 wherein an identification of the subset of links is transmitted by the first MLD as an Operating Mode (OM) of the first MLD, wherein the OM further indicates that the first MLD operates with one of the first capability and the second capability.

6. The method of claim 5 wherein the first MLD operates with one of:
   the second capability wherein a plurality of data frames comprises a first set of frames and a second set of frames, wherein the first set of frames is transmitted over a first link and the second set of frames is transmitted over a second link, and
   the first capability wherein the plurality of data frames is transmitted over one of the first link and the second link.

7. The method of claim 1 wherein an indication of the subset of links is transmitted by the first MLD as one of a Quality of Service (QoS) Null frame and a Power Save (PS)-Poll frame of the first MLD in response to the second MLD transmitting a beacon frame monitored by the first MLD, wherein the beacon frame comprises a set of second MLD links enabled by the second MLD and the one of the QoS Null frame and the PS-Poll frame defines a set of first MLD links chosen from the set of second MLD links.

8. The method of claim 1 further comprising transmitting by the first MLD, an information defining a maximum RF chain switching time.

9. The method of claim 8 wherein the subset of links comprises an initial set of links used by the second MLD to transmit a Transmit Opportunity (TX_OP) packet during a period equal to the maximum RF chain switching time.

10. An apparatus comprising:
   a first multi-link device (MLD) configured to transmit a first capability defining a first number of Spatial Streams (SS) supported by the first MLD for a single link exchange over one of a subset of links from a plurality of links, transmit a second capability defining a second number of SS supported by the first MLD for each link of a multi-link exchange, and configure at least one Radio Frequency (RF) chain of the first MLD to enable communication over the subset of links; and
   a second MLD configured to transceive with the first MLD over the subset of links;
   wherein the second MLD transmits beacon frames in a regular interval, the first capability is transmitted in response to the second MLD transmitting a beacon frame which indicates the single link exchange between the first MLD and the second MLD and the second capability is transmitted in response to the second MLD transmitting a beacon frame which indicates the multi-link exchange between the first MLD and the second MLD; and
   wherein the first MLD transmits data frames only over the first number of SS of a single link of the first MLD to the second MLD in response to the first capability being transmitted by the first MLD and the first MLD transmits data frames over the second number of SS of each link of a plurality of links of the first MLD to the second MLD in response to the second capability being transmitted by the first MLD.

11. The apparatus of claim 10 wherein the first MLD is configured to:
transmit an indication that the first MLD operates with the single link exchange over the subset of links,
receive an initial frame from the second MLD on a first link selected from the subset of links, and
configure at least the first number of RF chains of the first MLD to enable communication over the first link.

12. The apparatus of claim 11 wherein the first MLD is configured to configure the second number of RF chains for each link of the subset of links from the plurality of links before receiving the initial frame.

13. The apparatus of claim 11 wherein the indication is included in a Media Access Control (MAC) header of a frame that the first MLD transmits to the second MLD.

14. The apparatus of claim 10 wherein the first MLD is a non-Access Point (AP) MLD and the second MLD is an AP MLD.

15. The apparatus of claim 10 wherein two or more RF chains of the first MLD share a common transceiver during the multi-link exchange.

16. A method for multi-antenna processing in multi-link wireless communication systems comprising:
transmitting by a non-Access Point (AP) Multi-Link Device (MLD), a first capability defining a first number of Spatial Streams (SS) supported by the non-AP MLD for a single link exchange over one of a subset of links from a plurality of links between the non-AP MLD and an AP MLD;
transmitting by the non-AP MLD, a second capability defining a second number of SS supported by the non-AP MLD for each link of a multi-link exchange; and
configuring at least one Radio Frequency (RF) chain of the non-AP MLD to enable communication over the subset of links from the plurality of links;
wherein the AP MLD transmits beacon frames in a regular interval, the first capability is transmitted in response to the AP MLD transmitting a beacon frame which indicates the single link exchange between the non-AP MLD and the AP MLD and the second capability is transmitted in response to the AP MLD transmitting a beacon frame which indicates the multi-link exchange between the non-AP MLD and the AP MLD; and
wherein the non-AP MLD transmits data frames only over the first number of SS of a single link of the non-AP MLD to the AP MLD in response to the first capability being transmitted by the non-AP MLD and the non-AP MLD transmits data frames over the second number of SS of each link of a plurality of links of the non-AP MLD to the AP MLD in response to the second capability being transmitted by the non-AP MLD.

17. The method of claim 16 wherein the plurality of links comprises a master link and a plurality of slave links, the non-AP MLD performing a multi-link exchange with the AP MLD by transceiving over the master link followed by transceiving over one or more slave links determined to be available based on a Clear Channel Assessment.

18. The method of claim 16 wherein the non-AP MLD performs a multi-link exchange with the AP MLD by transceiving over one or more of the plurality of links determined by a traffic category of each of the one or more links.

19. The method of claim 16 wherein a Clear Channel Assessment detects and removes a busy link from the subset of links.

20. The method of claim 16 further comprising transmitting by the non-AP MLD, an information defining a maximum RF chain switching time, and wherein the subset of links comprises an initial set of links used by the AP MLD to transmit a Transmit Opportunity (TX_OP) packet during a period equal to the maximum RF chain switching time.

* * * * *